Nov. 18, 1947.  W. F. ALLER  2,431,014

GAUGING DEVICE

Filed Nov. 17, 1943

INVENTOR.
W. F. Aller
BY Edward J. Noé
ATTORNEY.

Patented Nov. 18, 1947

2,431,014

UNITED STATES PATENT OFFICE 2,431,014

GAUGING DEVICE

Willis Fay Aller, Dayton, Ohio, assignor to The Sheffield Corporation, Dayton, Ohio, a corporation of Ohio Application November 17, 1943, Serial No. 510,596

2 Claims. (Cl. 73—37.5)

1

This invention relates to gauging apparatus for measuring or comparing workpiece surfaces.

One object of the invention is the provision of a gauging apparatus for determining the size relationship of a plurality of different workpiece surfaces, and arranged so that the reading or indication is obtained on a single means.

Another object is the provision of a gauging apparatus for simultaneously checking an internal measurement and an external measurement of workpiece surfaces and measuring the size differential of such surfaces regardless of variations, in a working range, of the size of either of said surfaces.

Another object is the provision of a gauging apparatus of the character mentioned, and employing fluid flow through parallel paths controlled by the internal and external workpiece surfaces to be checked, and associated with a common indicating device.

Another object is the provision of a gauging apparatus of the character mentioned, in which the fluid flow controlling members is a leakage orifice having diametrically opposed portions, and the gauging device is operated by the rate of flow of gaseous fluid.

Other objects and advantages of the invention will be apparent from the following description, the appended claims and the accompanying drawing, in which Fig. 1 is a side elevation of a gauging apparatus embodying the present invention, and showing the work engaging parts thereof in central vertical section;

Figure 1:
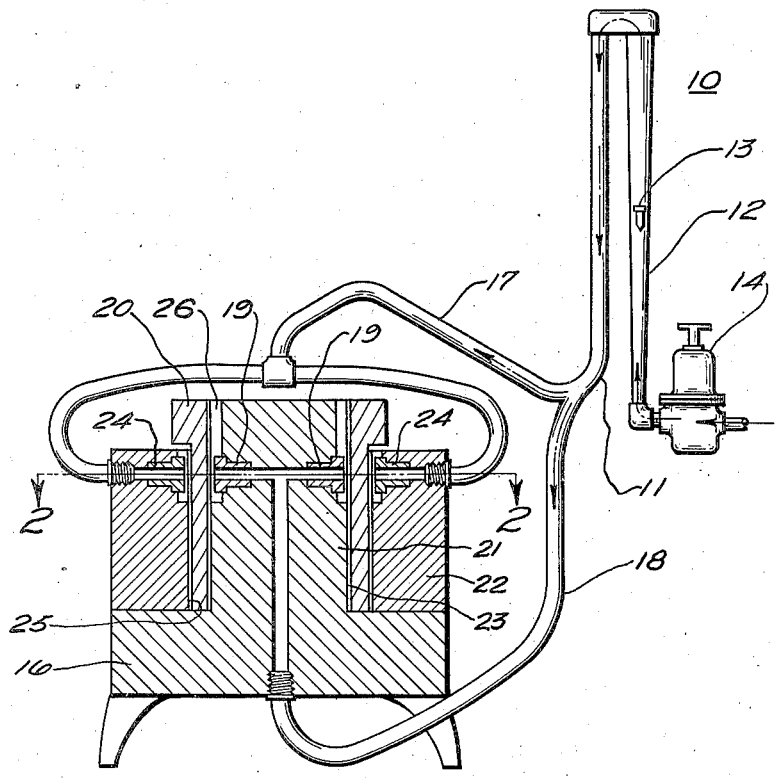

Referring more particularly to the drawing, in which the same reference numerals have been used to designate like parts in several views, the gauging device shown in Fig. 1 incorporates a measuring device 10 which, as herein shown, is adapted to provide an indication in accordance with the flow of fluid through a conduit 11 which leads from the instrument and which is associated, as will be presently described, with fluid flow controlling means that control fluid flow in accordance with the size of the workpiece surfaces being checked.

While the measuring instrument may take a wide variety of different forms or operate in response to changes in fluid flow by pressure measurements, it is preferred that the instrument include an indicator responsive to the rate of flow

2 of fluid from a suitable supply source of air pressure to and through the conduit 11. A gauging device of the character shown in Patent 2,254,259, granted September 2, 1941, may be used. Such an instrument as indicated at 10 comprises a transparent tube 12 having an upwardly flaring or tapered passage enclosing an indicator or float 13 the height of which, in the tube, is determined by the rate of flow of air or other fluid through the tube. The lower end of the tube is connected through an adjustable pressure regulating valve 14 to an air supply source, and the upper end of the tube is in free communication with the end of the conduit 11. The vertical position of the float 13 may be accurately measured by means of suitable graduations on or adjacent to the tube 12 which may be calibrated to show actual size differential in the diametrical or other measurements of the internal and external surfaces to be checked.

Figure 2:
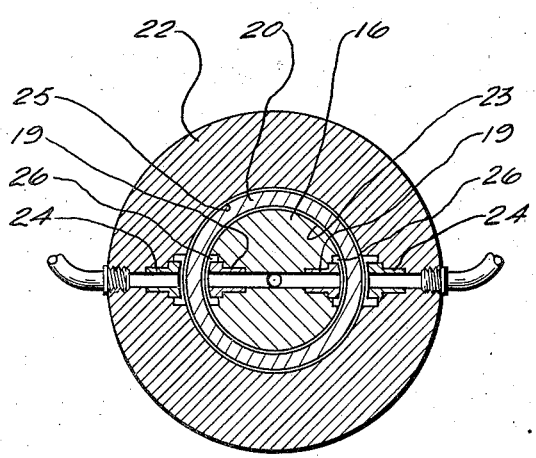
Fig. 2 is a transverse section on the line 2—2 of Fig. 1.
Figure 3:
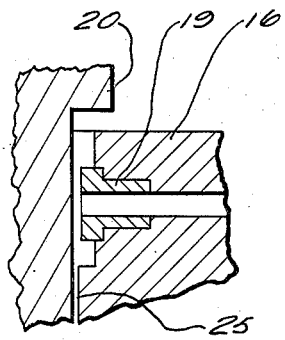
Fig. 3 is an enlarged sectional view showing a portion of the gauging apparatus.

The conduit 11 extends to the work holder 16, and has branch passages 17 and 18 one of which conducts the fluid to fluid flow controlling members associated with an internal surface of a part to be checked, while the other branch passage is associated with fluid flow controlling members controlled by another surface, which, in Figs. 1 and 2, is the external surface of the part to be checked. As shown in Figs. 1 and 2, the gauging device is adapted to show the size relationship of the outside and inside diameters of a workpiece such as a bushing or bearing member 20 to determine the wall thickness.

In accordance with the present invention, small equal increases or decreases in the diameters of both of the surfaces gauged are without effect on the indication produced, which merely shows the difference in the diameters of the two surfaces, and gives a measurement of the wall thickness of the part checked. This part, indicated at 20, is applied to the work holder 16 which has inner and outer work receiving portions 21 and 22 respectively. Portion 21 is provided with a pair of diametrically opposed gauging nozzles 19, the cylindrically curved outer surfaces of which are spaced a very small distance inwardly of the cylindrical outer surface 23 of the portion 21. The surface 23 has a diameter that is slightly smaller than the inside diameter or surface to be checked on the part 20. The two gauging nozzles 19 are in free communication through a common connection with the branch passage 18 so the fluid supplied under pressure to that branch passage will leak through the gauging nozzles, between the outer surfaces of these nozzles and the inner surface of the part 20. The fluid supplied through the nozzles flows freely to the atmosphere through exhaust passages 26. Thus the distance between the workpiece and the outer surfaces of these nozzles will determine the rate of flow of fluid through the branch passage 18.

The outer portion 22 of the work holder has a pair of diametrically opposed gauging nozzles 24, the inner cylindrically curved surfaces of which are spaced a very slight distance outwardly of the cylindrical surface 25 of this portion of the work holder. The cylindrical curvature of the nozzles 24 is such as to provide a concave surface that is concentric with the work axis, the gauging nozzles themselves being of annular form concentric with the central passage through the nozzles. The two nozzles 24 are connected in parallel to the branch passage 17. By arranging the two nozzles 24 opposite one another, a balancing effect is provided so that if the part is not exactly centered with respect to the holder, the same amount of leakage of air takes place as if it were exactly centered, the increase in spacing between the work and one nozzle causing a corresponding decrease in the space between the other nozzle to give the same total rate of flow of leakage air.

The two branch passages 17 and 18 are connected to the conduit 11 extending from the upper end of the gauging instrument, which shows the fluid flow through the several gauging nozzles. It will be obvious that, in a working range of sizes of internal and external diameters, which of course are of such character that the workpiece can be applied to the work holder, the reading showing the difference between the inside and outside diameters of the surfaces checked will be accurate, and not affected by the exact diameter of either the inside or the outside surfaces. If both the inside and outside diameters are, say, two ten thousandths of an inch larger than an intended size, there will be an increase in the rate of flow of fluid to the gauging nozzles 19, and a corresponding decrease of the rate of flow of fluid through the gauging nozzles 24, to produce the same reading, and to show the same wall thickness.

It should be understood that the use of two opposed gauging nozzles for measuring any diametrical measurement of a conical, cylindrical, or other surface to be measured gives a preferred construction in that it permits individual examination of the surface gauged along different diameters. However, the gauging means or orifices used in conjunction with a surface to be gauged may be distributed annularly around the surface or in fact may be one continuous annular groove giving an average condition in measuring the surface gauged, where it is unnecessary that different diametrical measurements of the same surface be obtained.

The actual clearance between the ends of the nozzles and the work is quite small, and the distance that the ends of the nozzles are recessed back of the adjacent positions of the work holder in which they are arranged is also quite small, and measured in thousandths of an inch or even ten thousandths of an inch in cases of extreme accuracy. The drawings, however, show these clearances on a greatly exaggerated scale, in order to make the spacing apparent for purposes of illustration.

Since the holder in which the work is placed has an annular socket with just a very small clearance between the work and the male and female surfaces of the socket, workpieces that are considerably out of size cannot enter the work holder. If the workpiece does enter the holder, then the gauging device checks the distance between the internal and external surfaces of the workpiece.

There is no intention to limit the invention to the particular embodiment herein shown, but on the other hand it is intended to cover all modifications and alternative constructions falling within the spirit and scope of the invention as expressed in the appended claims.

What is claimed is:

1. Gauging apparatus comprising a fluid operated gauging device having means responsive to changes in fluid flow, fluid supply means extending to said gauging device and having branch passages, two diametrically opposed fluid flow controlling members for cooperating with an internal surface of a work-piece to form fluid leakage paths therewith and connected in parallel to one of said branch passages, two diametrically opposed fluid flow controlling members for cooperating with the external surface of the workpiece to form fluid leakage paths therewith and connected in parallel to the other said branch passage, a work holder in which all said controlling members are held in predetermined relative position, said flow controlling members jointly determining the flow of fluid through said gauging device.

2. Gauging apparatus comprising a work holder providing a wall having an annular inside surface telescopically engageable with the outside of an annular workpiece and having a concentric plug member telescopically engageable with the inside of the workpiece, a pair of diametrically opposed inwardly facing fluid flow controlling members in said first mentioned surface adapted for cooperative relationship with the external surface of the workpiece to provide fluid leakage paths therewith, a pair of diametrically opposed outwardly facing fluid flow controlling members in said plug member adapted for cooperative relationship with the internal surface of the workpiece to provide fluid leakage paths therewith, and a fluid operated gauging device having an indicating means responsive to changes in the fluid flow, and parallel fluid connections from all of said controlling members to said gauging device.

WILLIS FAY ALLER.

REFERENCES CITED

The following references are of record in the file of this patent:

UNITED STATES PATENTS

| Number | Name | Date |
|---|---|---|
| 1,971,271 | Mennesson | Aug. 21, 1934 |
| 2,139,282 | Poock et al. | Dec. 6, 1938 |